(12) United States Patent
Gregorio et al.

(10) Patent No.: US 8,510,762 B1
(45) Date of Patent: Aug. 13, 2013

(54) GENERATE CUSTOM CLIENT LIBRARY SAMPLES BASED ON A MACHINE READABLE API DESCRIPTION

(75) Inventors: Joseph Charles Gregorio, Apex, NC (US); Anthony Julian Aiuto, Great Neck, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/436,675

(22) Filed: Mar. 30, 2012

Related U.S. Application Data

(60) Provisional application No. 61/546,424, filed on Oct. 12, 2011.

(51) Int. Cl.
*G06F 13/00* (2006.01)
(52) U.S. Cl.
USPC ............................ 719/328; 717/104; 717/106
(58) Field of Classification Search
USPC .................................. 719/328; 717/104, 106
See application file for complete search history.

(56) References Cited

U.S. PATENT DOCUMENTS

2009/0150423 A1* 6/2009 Spanton et al. ............... 707/102
2011/0029949 A1* 2/2011 Adams et al. ................. 717/109

* cited by examiner

*Primary Examiner* — Andy Ho
(74) *Attorney, Agent, or Firm* — Birch, Stewart, Kolasch & Birch, LLP

(57) ABSTRACT

A system, method and computer-readable storage medium provided as a Web service for on-demand generation of code samples for a specified API, target programming language and target platform. The system can include an interface, a Web application, a data store, and a compile server. The Web application is configured to receive a request including a target programming language and target platform from the user interface, to retrieve a description of an API, to generate a source library, to create a model of the API based on the API description, to select a template based on the target programming language and target platform, to expand the template to create a code sample. The data store stores generated code artifacts, and stores the generated source library for the API description. The compile server is configured to generate compiled libraries and documentation, and store compiled libraries and documentation in the data store.

20 Claims, 5 Drawing Sheets

FIG. 5

Parameters for a Library Request

- API name
- API version
- Language

Output from Code Generator – ZIP file

- Compiled generated library as a JAR file
- Source for generated library as a ZIP file
- Generic Java library (binary) as a JAR file
- JARs for generic libraries that are dependencies
- Example use case for the library (application name, developer key)

GENERATE CUSTOM CLIENT LIBRARY SAMPLES BASED ON A MACHINE READABLE API DESCRIPTION

This Non-provisional application claims the benefit of U.S. Provisional Application No. 61/546,424 filed on Oct. 12, 2011. The entire contents of the above application is hereby incorporated by reference and for which priority is claimed under 35 U.S.C. §119(e).

TECHNICAL FIELD

The inventive field relates to generating API libraries and custom working samples based on a machine readable API description.

BRIEF SUMMARY

This document describes a method performed by one or more processors. The method including receiving a request for an API client library, the request including an API identifier, a target programming language, and a target operating system platform, retrieving a machine-readable description of an API based on the identifier for the API, building a model of the API based on the machine-readable description, generating an API library source code in the target programming language, receiving a sample template for a generic sample application for the API library, expanding the sample template by incorporating a data structure in the target programming language to generate one or more code samples using the API, and storing in a unique Web location the generated code samples for later download.

An aspect is a method wherein the machine-readable description of the API is a data format that describes HTTP methods, URLs, and parameters that can be supplied to each method in the HTTP API.

An aspect is a method wherein the sample template is a generic sample application that has parts blocked out, to be filled in with programming language and API specific code.

An aspect is a method wherein the model is built by converting the machine-readable API description into a tree data structure.

An aspect is a method further including configuring authentication credentials, and creating a model of the authentication credentials.

An aspect is a method wherein a plurality of the code samples are generated based on the API.

An aspect is a method wherein one code sample is generated as needed.

An aspect is a method wherein the one or more code samples are served in response to receiving the API identifier, the target programming language, and the target operating system platform.

This document describes a system of one or more processors. The system including a client having an interface, a Web application, a data store, a task queue, and a compile server. The Web application is configured to receive a request including a target programming language and target platform from the interface, to retrieve a description of an API, to generate a source library, to create a model of the API based on the API description, to select a template based on the target programming language and target platform, to expand the template to create a code sample. The data store is configured to store previously generated code artifacts, and store the generated library for the API description. The task queue is configured to dispatch a compile command to a compile server, and to dispatch a documentation generating command to the compile server. The compile server is configured to generate compiled libraries and documentation, and store compiled libraries and documentation in the data store.

An aspect is a system wherein the interface is a Web user interface that is configured to accept authentication credentials from a user and perform authentication, and is configured to allow selection of an API, a target programming language, and a target platform, and receive in response a generated library, code samples, and documentation.

An aspect is a system wherein the response includes a compressed file containing compiled generated library, the source for the generated library, and an example use case for the library.

An aspect is a system wherein the interface is for submitting as an HTTP message a structured document comprising identification information of an API, including an API name, API version, and target programming language.

This document describes a computer-readable storage medium storing a computer program that, when executed by a computer performs steps of receiving a request for an API client library, the request including an API identifier, a target programming language, and a target operating system platform, retrieving a machine-readable description of an API based on the identifier for the API, building a model of the API based on the machine-readable description, generating an API library source code in the target programming language, receiving a sample template for a generic sample application for the API library, expanding the sample template by incorporating a data structure in the target programming language to generate one or more code samples using the API, and storing in a unique Web location the generated code samples for later download.

These and other aspects are described in detail with respect to the drawings. Other features, aspects, and advantages of the subject matter will become apparent from the description, the drawings, and the claims.

BRIEF DESCRIPTION OF THE DRAWINGS

The accompanying drawings constitute part of this specification. In the drawings.

FIG. 5 is an example of input parameters and output parameters for the library generation service.

DETAILED DESCRIPTION

Figure 1:
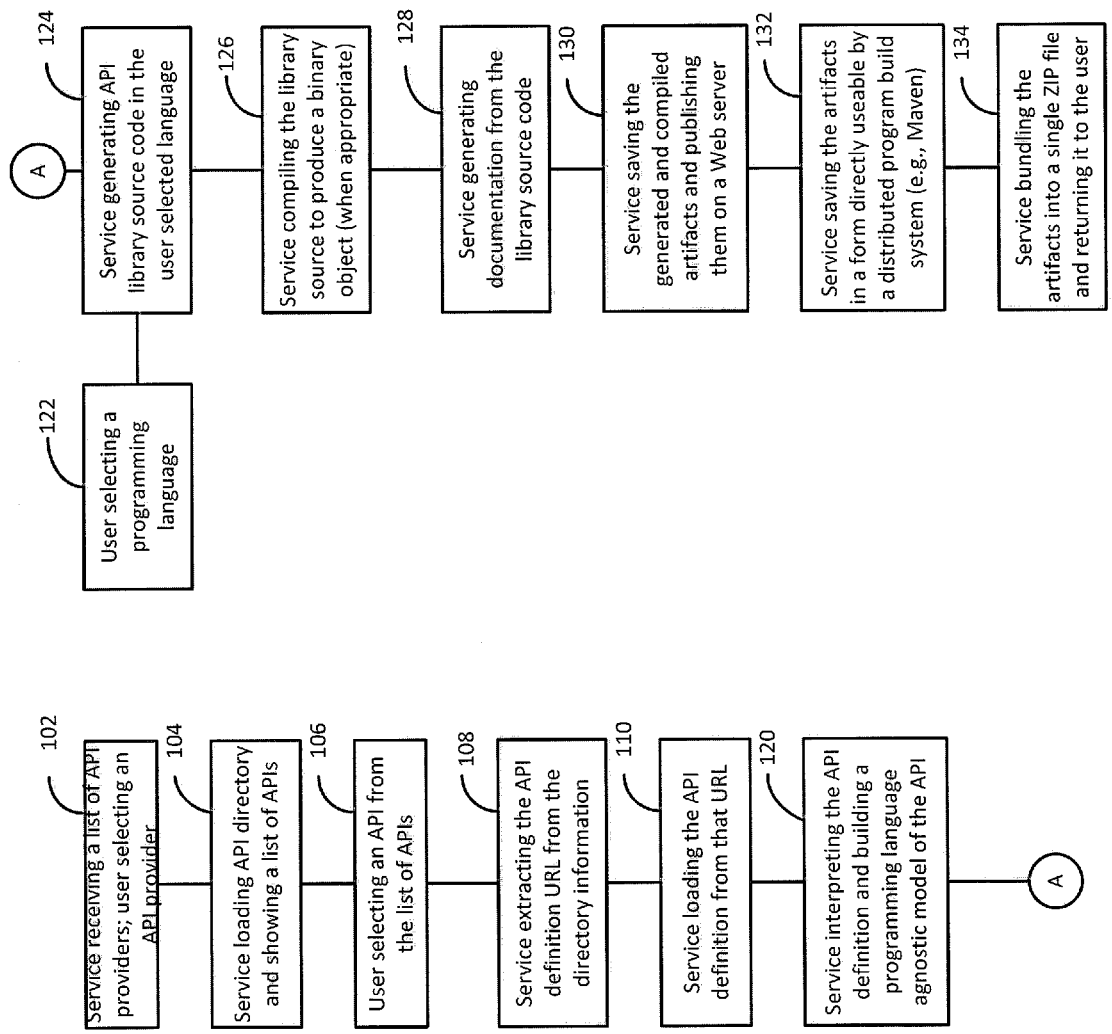
FIG. 1 is a flow diagram for a library generation service.

Libraries for Application Programming Interface's (API) can be stored, for example in repositories, for future use by client applications. Client applications are typically implemented in a particular programming language, as well as targeted for a particular platform. However, even with tools for code generation, creating and storing libraries for API's for each programming language and particular platform can over time take tremendous manpower resources and hardware resources. For example, code generators have been written for library generation. However, hand publishing (even with automation) becomes untenable as the rate of API production and/or change to APIs soars.

In the absence of a library entry, a developer may create and store an API as part of a programming project, which is in a programming language and for a target platform. Others having a need for a library that refers to the same API, but for a different programming language, would be faced with the task of translating the library into the respective desired programming language.

Subsequently, there is a need for a Web service that can provide libraries for API's on demand for any of a variety of programming languages and target platforms. Instead of storing every possible combination of API for programming languages and target platforms, generation of API's as needed reduces memory resources.

There are several schemes for describing a service API in a descriptive language. For example, Google API Discovery, Web Application Description Language (WADL), and Web Services Descriptive Language (WSDL).

An aspect embodies code generation as a Web service, so that a developer can specify the location of an API description in a computer network and a target programming language and receive a library that is generated on demand.

Of particular value is that by making library generation demand-pull from the end user (a software developer) it obviates the need for service providers to produce and publish language specific libraries for their describable APIs.

Service providers that provide API descriptions for the service may wish to control authentication over a particular user and application combination. An aspect of the present invention is the capability to specify authentication requirements.

To further enhance the benefit of supplying a generated library, an aspect is to generate working sample code for the generated library. Such working sample code can demonstrate a use of the API, and may even be sufficient for a developer to incorporate directly into a project.

Library Generation Service

A service is provided for creating and publishing API libraries from a machine readable API description. The inputs are an API description (e.g. an API Discovery Document), a requested target programming language, and a target platform. The output is a set of artifacts which provide an API library source specifically for that API in the target programming language. Target programming languages may include any high-level programming language, such as Java, Python, C#, Objective-C, JavaScript, Dart, Google Web Toolkit, LISP, Fortran, C, and C++. Target platform refers to an operating system and associated hardware, and can include MacOS, Windows, Linux, Android, iOS, and associated computer systems. One of ordinary skill in the art would understand that any number of combinations of programming language and target platform are possible. An API library source is source code which exposes the functionality of an API in a target programming language, with possible refinements for a specific target platform. There are several ways that the service can be embodied.

The user (who is typically a client developer) can select a directory service from among known API providers and select from a list of known APIs provided by a directory service. Known API providers include Google APIs, APIs of the U.S. National Weather Service, and Mashery.com, to name a few. In this scenario, the library generation service will read the directory of a selected API provider (e.g. located at www.googleapis.com) and prepare a list of APIs. Subsequently, (1a) the user can pick an API from the list;

(1b) the library generation service can use information from the directory service to download the API description;

(1c) the library generation service can generate an API library source for the downloaded API description in the requested language;

(1d). the library generation service can publish that library source to the user.

Flexibility is enabled in that some of these steps can be performed directly by the user. For example, the user can provide the URL of an alternate API provider which provides an API directory. In this case the library generation service will use this alternate directory and proceed at step 1a. The user can provide the URL of an API description directly. In this case the process can proceed at step 1b. The user can provide a complete API description document which it uploads to the library generation service. In this case the process can proceed at step 1c.

At step '1d', the generated library can be published several different ways. For example, any or all of the combination of library source, documentation generated from the source, a compiled binary object, and instructions for use can be provided. In a further embodiment, samples of using the library can be provided. Alternatively, a library source, documentation, compiled binary, and instructions can be bundled in a single download file for the user. Further, any one of the above components can be made available for easy reuse by others. Specifically, the documentation for generated libraries can be made available for Web browsing. The compiled binary objects can be made available in an online repository for an application build system (e.g., Maven).

API providers supply directories of APIs. A directory entry may show details about a supported API, including its name, a brief description of what it does, and a link to its documentation. Each supported API can have multiple directory entries, one for each of its supported versions.

Among schemes for describing APIs, the Google API Discovery Service provides Discovery Documents. A Discovery Document is a machine-readable description of a particular API. The Discovery document describes the surface for a particular version of an API. The document provides details on how to access the various methods of each API via REST HTTP calls (for example, GET). A Discovery Document can include descriptions of the data and methods associated with the API, as well as information about authentication requirements or access rights, and descriptions of schemas, parameters and available parameter values.

Upon selecting an API provider, a directory is received from an API provider that includes a list of APIs. The list of APIs in the directory is provided to a user. The user can select from the list of available APIs.

Using the API Discovery Service as an example, a Discovery Document is fetched for a selected API. A flowchart for an on-demand pull service for APIs is shown in FIG. 1. At step 102, the user can select an API provider from a list of known API providers. At step 104, the service can send a query to a directory service of a selected API provider and show a list of APIs. At step 106, the user can pick an API from the list of APIs. At step 108, the service can extract information, such as an API definition URL, from the directory. At step 110, the service can load a API definition document based on the URL provided in the API description.

At step 120, the service can interpret the API definition document and can build a programming language agnostic model of the API. At step 122, the user can select a target programming language. At step 124, the service can generate an API library source code in the user selected programming language. At step 126, upon receiving a compile command, the service can compile the library source to produce a binary object. At step 128, the service can generate documentation from the library source code.

At step 130, the service can save the generated and compiled artifacts and publish them on a Web server. At step 132, the service can save the artifacts in a layout suitable for a repository in a form directly useable by a distributed program build system. At step 134, the service can bundle the artifacts into a compressed format, such as a single ZIP file and return the compressed format to the user.

The library generation service provides flexibility by allowing a user to enter the process at the publishing step. The user can present the service with a URL that specifies "documentation for the Java library for API X" and the service can generate the library and provide the documentation if it does not already exist.

Working Sample Code Generation Service

Generating API libraries on-demand can alleviate the need to create API libraries in advance for various combinations of programming languages and target platforms. The API library itself may not be sufficient for an understanding of how to use the API. In addition, some level of authentication of a user and an API may be necessary in particular applications. In order to assist in understanding how to use the API, an embodiment can include a service for generating sample working code for an API. However, client library working samples need to be kept up to date with changes in an API. As the number of API's grow and as API's change, creating working samples and keeping working samples up to date becomes more complicated. Accordingly, the API generation service provides a tool that can create working samples for accessing the API using a generated client library.

Generation of libraries, working samples and documentation can be done by a Code Generation service. The Code Generation service may provide a mechanism to generate libraries, working code samples, documentation, and binary artifacts for APIs that have been described in a formal manner, such as the Google Discovery Document. The Code Generation service can also serve as a primary distribution point for APIs and libraries for the APIs. The Code Generation service further provides an infrastructure on which parties can build sophisticated IDE plugins for other environments; e.g. Xcode and Visual Studio.

Figure 2:
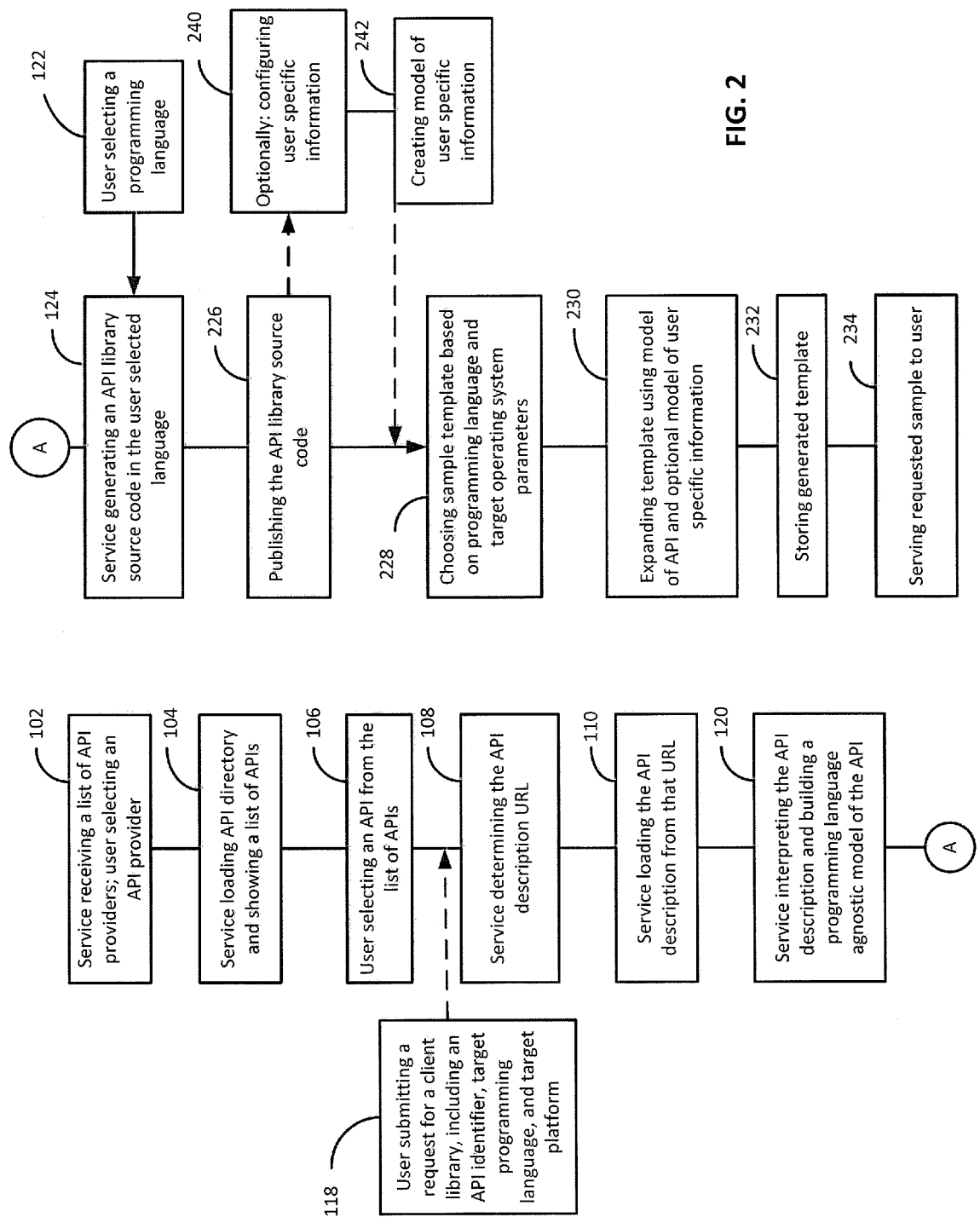
FIG. 2 is a flow diagram for a custom client working sample generation service.

FIG. 2 is a flowchart for the process of generating working samples in association with a library for an API. Steps 102 to 124 are the steps shown in FIG. 1 for generating a library source, and have already been described above. In generating a library source, at step 118, a request for a client library can include an identifier of an API, a target programming language, and a target operating system platform. As in steps 126 to 134 in FIG. 1, in step 226 the API library can be published.

The process of generating working samples creating an authentication model. At step 240, authentication information, such as authentication credentials that are specific to the user and the API can be configured. At step 242, a model of the authentication information can be created, where a model is for a specific programming language and operating system platform.

At step 228, a sample template can be chosen based on the programming language and target operating system parameters. The sample template is a generic sample application for a programming language and platform in which the key parts of the template are blocked out, to be replaced with API specific code. At step 230, the sample template can be expanded using the model of API, as well as a model of user specific information, as requested. At step 234, the expanded sample template corresponding to the requested API, target programming language, and target operating system platform can be served to the user. Alternatively, at step 232, the sample templates can be stored at a unique Web location to be downloaded as needed.

In alternative embodiments, the creation of the working samples may be done all at once when the Discovery Document is first read, or the creation may be 'lazy', that is, working samples are created just in time as they are needed. Also, the Discovery Document can be retrieved over the Internet or stored locally with the generating service. Further, a working sample can be a sample that accesses one or more APIs. Still further, a working sample may be generated for public consumption, or may be generated for a narrow audience, such as Trusted Testers, and have a limited distribution.

Code Generation Service

Figure 3:
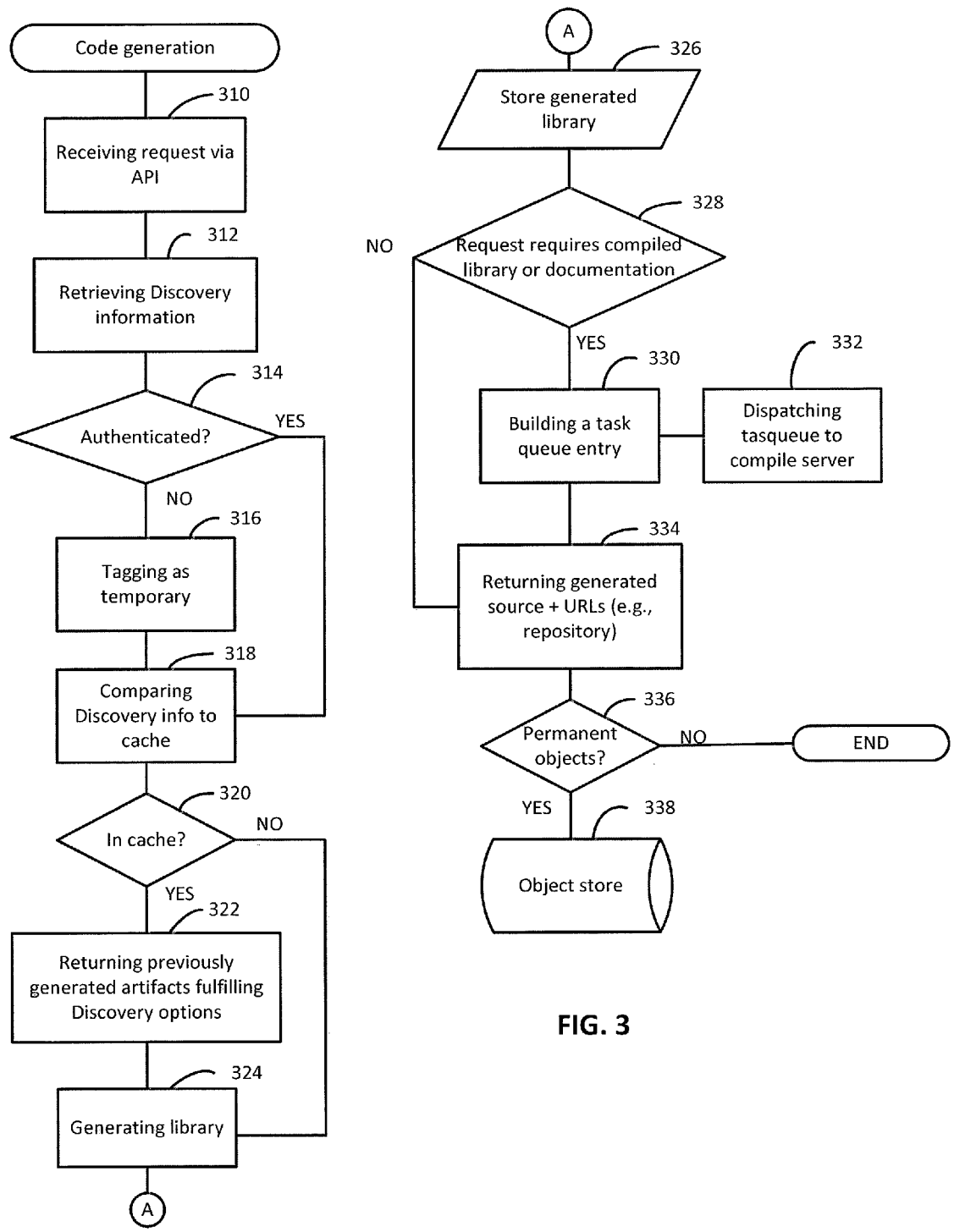
FIG. 3 is a block diagram for a working sample generation service.
Figure 4:
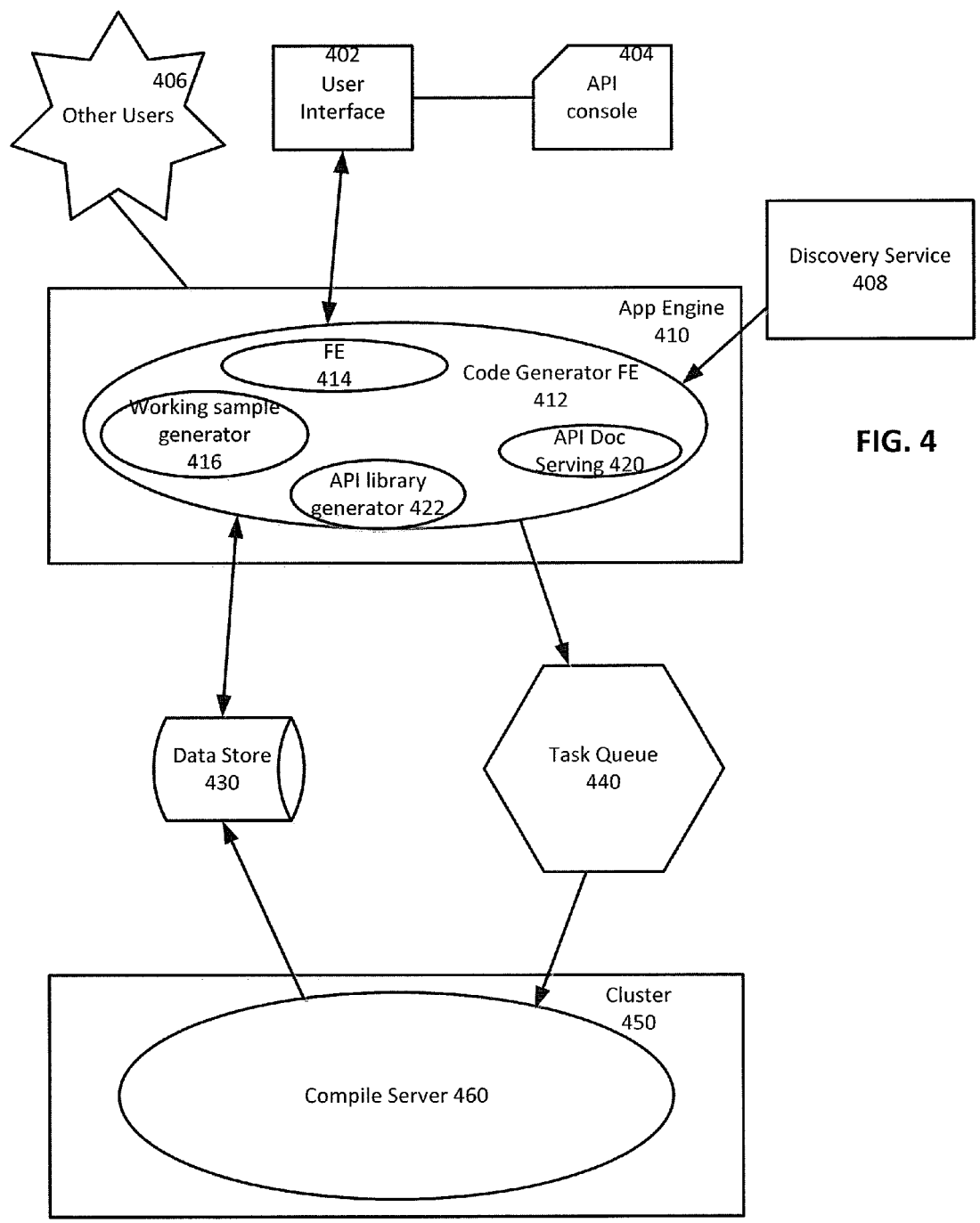
FIG. 4 is a block diagram for an example computer implementation for the generation services.

An example system for performing a code generation service is shown in FIG. 4. An operation of the code generation service is shown in FIG. 3. The example system can include one or more computer terminals 404 that are in communication with an application hosting service 410, such as App Engine. The service 410 can store and retrieve data in data store 430, which can obtain compiled code from compiler server 460. Code to be processed by the compile server 460 can be temporarily maintained in a task queue 440. It is understood that App Engine 410, data store 430, and compile server 460 may be in a cluster of computers 450. The service 410 can include a code generator 412, a working sample generator 416 for creating sample templates, API library generator 422 that generates an API library from an API description, and API Doc Serving component 420.

The basic flow through a typical request is:

Step 310, a request from a Web user interface can be received via an API, and can contain credentials that authenticate the user as having access rights to specific API's.

Step 312, Code generator 412 retrieves discovery information from Discovery service 408, which may be both with the user's authentication credentials and without them.

Step 314, if the information is not available unauthenticated, then, step 316, the information can be tagged as temporary.

Step 318, the discovery information can be compared against information about previously generated artifacts in the cache (data store 430). At step 320, if there is a match ('YES'), step 322, previously generated artifacts fulfilling the requested parameters can be returned.

Step 324, the library using library generator 422 can generate and save in a data store 430.

Step 328, If the request requires a compiled library or documentation, step 330, a task queue entry 440 can be built and may include a compile command and step 332, the compile command can be dispatched to the compile server 460 to complete.

Step 334, the generated source, along with URLs to poll for availability of the compiled libraries in data store 430, can be returned. For libraries tagged as temporary, a short lived storage key can be used. For others use a permanent key can be used.

Step, 336, For permanent objects, step 338, generated documentation files can be placed in Data Store 430 for future serving to users by way of the API Doc Serving component 420.

Library Generation Interface

The library generation service may be provided with a Web user interface. Alternatively, an XML and JSON interface can be provided so that a tool, such as Eclipse, can use the library generation service directly. Eclipse is an interactive software development environment. Developers that interact with the Web user interface require authentication. The Web user interface provides an authentication input.

As can be seen in FIG. 5, the library generation service can take as inputs, parameters including API name, API version, and programming language. These parameters can be provided by way of the user interface, and sent in a HTTP message.

The library generation service can return a ZIP file containing one or more of the following (as applicable for the choice of programming language), the source for the generated library as a ZIP file, the compiled generated library in binary format, the reference documentation for the generated library, other source or binary libraries that the generated library depends on, and an example use case for the library, provided as a separate source file.

Web User Interface

A Web user interface to the service can help get API developers up and running as quickly as possible. The typical developer has to clear some hurdles, such as Authentication, downloading core libraries, and API specific libraries, before they can get code up and running talking to resident APIs. The disclosed Web service clears those hurdles by having a single page where developers can answer some simple questions and download a fully functional sample for the programming language and platform of their choice. The Web service component allows selecting target APIs, programming languages and target platforms to generate samples, documentation and libraries. The Web UI is a standalone page or can be embeddable as a JS widget.

The Web interface can provide developers with on-demand working samples to help them get started in their specific development environment. Developers can choose a combination of API, language, deployment environment, and (sometimes) development environment and the service provides them with a block of code they can directly execute to get them started. The service can use the Code Generation infrastructure to generate samples through templates that are managed by the service.

Computer Implementation for Clients and Servers

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by one or more processors, the method comprising:

receiving a request for a client library for an API, the request including an API identifier, a target programming language, and a target operating system platform;

retrieving a machine-readable description of the API based on the identifier for the API;

building a model of the API based on the machine-readable description;

generating an API library source code in the target programming language;

receiving a sample template for a generic sample application;

expanding the sample template by incorporating a data structure in the target programming language to generate one or more code samples using the API library source code; and storing in a unique Web location the generated code samples for later download.

2. The method of claim 1, wherein the machine-readable description of the API is a data format that describes HTTP methods, URLs, and parameters that can be supplied to each method in the API.

3. The method of claim 1, wherein the sample template is a generic sample application that has parts blocked out, to be filled in with programming language and API specific code.

4. The method of claim 1, wherein the model is built by converting the machine-readable description into a tree data structure.

5. The method of claim 1, further comprising configuring authentication credentials, and creating a model of the authentication credentials.

6. The method of claim 1, wherein a plurality of the code samples are generated based on the API library source code.

7. The method of claim 1, wherein one code sample is generated as needed.

8. The method of claim 1, wherein the one or more code samples are served in response to receiving the API identifier, the target programming language, and the target operating system platform.

9. A system of one or more processors, the system comprising:

a client having an interface;

a Web application;

a data store;

a task queue; and a compile server, the Web application is configured to receive a request including a target programming language and target platform from the interface, to retrieve a description of an API, to generate a source library, to create a model of the API based on the API description, to select a template based on the target programming language and target platform, to expand the template to create a code sample, the data store is configured to store previously generated code artifacts, and store the generated library for the API description, the task queue is configured to dispatch a compile command to the compile server, and to dispatch a documentation generating command to the compile server, the compile server is configured to generate compiled libraries and documentation, and store compiled libraries and documentation in the data store.

10. The system of claim 9, wherein the interface is a Web user interface that is configured to accept authentication credentials from a user and perform authentication, and is configured to allow selection of an API, a target programming language, and a target platform, and receive in response a generated library, code samples, and documentation.

11. The system of claim 10, wherein the response includes a compressed file containing compiled generated library, the source for the generated library, and an example use case for the library.

12. The system of claim 9, wherein the interface is for submitting as an HTTP message a structured document comprising identification information of an API, including an API name, API version, and target programming language.

13. A computer recordable medium storing a computer program that, when executed by a computer performs steps of:

receiving a request for a client library for an API, the request including an API identifier, a target programming language, and a target operating system platform;

retrieving a machine-readable description of the API based on the identifier for the API;

building a model of the API based on the machine-readable description;

generating an API library source code in the target programming language;

receiving a sample template for a generic sample application;

expanding the sample template by incorporating a data structure in the target programming language to generate one or more code samples using the API library source code; and storing in a unique Web location the generated code samples for later download.

14. The computer recordable medium of claim 13, wherein the machine-readable description of the API is a data format that describes HTTP methods, URLs, and parameters that can be supplied to each method in the API.

15. The computer recordable medium of claim 13, wherein the sample template is a generic sample application that has parts blocked out, to be filled in with programming language and API specific code.

16. The computer recordable medium of claim 13, wherein the model is built by converting the machine-readable description into a tree data structure.

17. The computer recordable medium of claim 13, the computer performs further steps of configuring authentication credentials, and creating a model of the authentication credentials.

18. The computer recordable medium of claim 13, wherein a plurality of the code samples are generated based on the API library source code.

19. The computer recordable medium of claim 13, wherein one code sample is generated as needed.

20. The computer recordable medium of claim 13, wherein the one or more code samples are served in response to receiving the API identifier, the target programming language, and the target operating system platform.

* * * * *